July 29, 1941.  H. R. MOULTON  2,250,597
OPHTHALMIC LENS AND METHOD OF MAKING SAME
Filed June 14, 1939
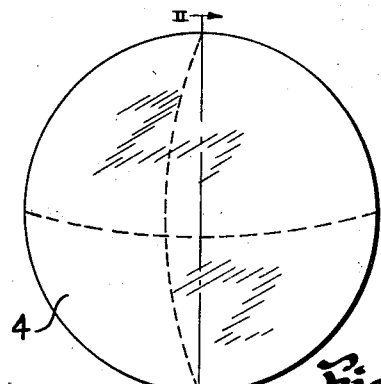
Fig. I
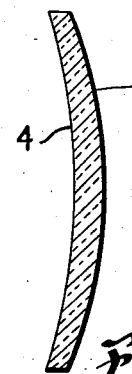
Fig. II
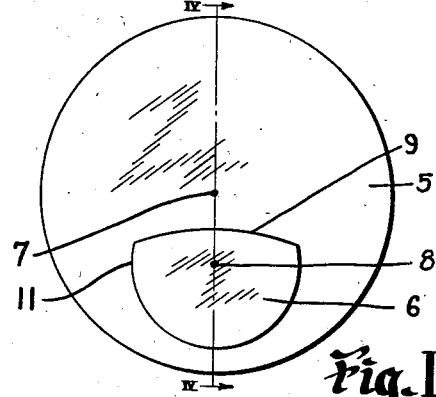
Fig. III
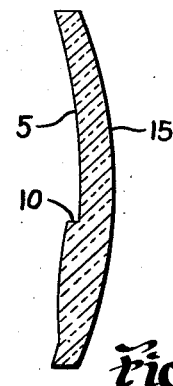
Fig. IV
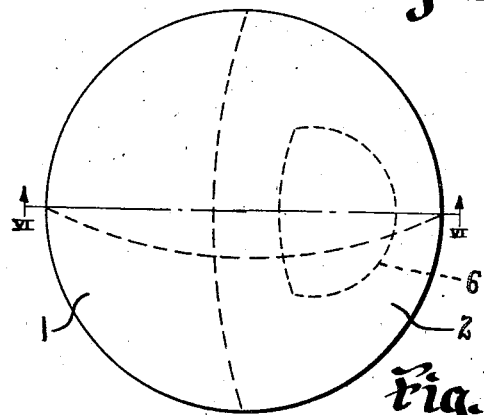
Fig. V
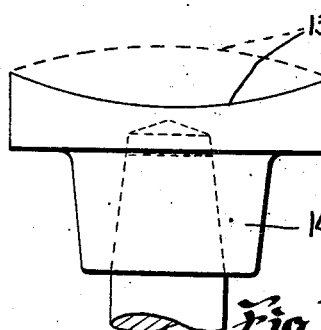
Fig. VII
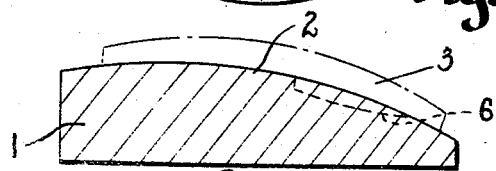
Fig. VI
INVENTOR.
HAROLD R. MOULTON
BY Harry H. Styll.
ATTORNEY.

Patented July 29, 1941

2,250,597

UNITED STATES PATENT OFFICE 2,250,597

OPHTHALMIC LENS AND METHOD OF MAKING SAME

Harold R. Moulton, Southbridge, Mass., assignor to American Optical Company, Southbridge, Mass., a voluntary association of Massachusetts Application June 14, 1939, Serial No. 279,166

8 Claims. (Cl. 88—54)

This invention relates to improvements in lenses made of a transparent plastic synthetic resinous lens composition and to improved means and methods of making and dispensing the same.

One of the principal objects of the invention is to provide a new and improved plastic lens having a surface on one face modified from a configuration of a surface that would be required for a lens of the index of refraction of the lens material for a given prescriptive value of lens to give the required prescriptive value of the lens when the lens surface of the opposite face is ground by surfacing tools calculated and made for an index of refraction different from that of the lens material.

Another object of the invention is to provide an improved process of making plastic lenses so that the required prescriptive value of the finished lens may be obtained when the second surface of the lens is ground with grinding tools calculated and made for surfacing lenses of a different index of refraction from that of the lens material employed.

Another object of the invention is to provide an improved method of making and dispensing lenses made of a plastic material.

Other objects and advantages of the invention will become apparent from the following specification taken in conjunction with the accompanying drawing. It is apparent that various changes may be made in the details of construction and arrangement of parts and the steps of the process without departing from the spirit of the invention as expressed in the accompanying claims. The invention therefore should not be limited to the exact matters shown and described as preferred forms have been shown and described by way of illustration only.

Referring to the drawing:

Fig. I is a front view of a continuous surface lens of the invention;

Fig. II is a cross section on line II—II of Fig. I;

Fig. III is a front view of a multifocal or bifocal lens of the invention;

Fig. IV is a cross section on line IV—IV of Fig. III;

Fig. V is a top view of a mold for molding a surface of the lenses;

Fig. VI is a cross section on line VI—VI of Fig. V; and

Fig. VII is a front elevation of a tool for grinding the prescription side of the lenses.

Plastic material for the production of lenses has recently been perfected and produced. This material is transparent, lighter than glass, isotropic and molds easily to good surfaces. This material has chiefly been developed by producers outside of the optical art, primarily in the chemical field. Until very recently the material was so soft it would scratch easily and its surfaces could not be ground by lens grinding tools because they chewed and gummed.

The refractive index of this material also varies greatly from that of optical crown glass from which glass lenses have been produced. The lens grinding tools now in existence both in the hands of the manufacturers and prescription dispensers have been calculated and made for the index of refraction of optical crown glass, namely substantially from about 1.515 to about 1.535.

Lenses are made and dispensed in the optical art as follows:

The manufacturer makes one side of the lens blank, the side with the most difficult surfaces to produce. The prescription dispenser is provided with grinding tools mostly having simple spherical surfaces, and completes the lens to prescription value by grinding the second side of the lens blank. The combination of the manufacturer's surface and the prescription dispenser's surface produces the required prescriptive value of the lens. The manufacturer cannot provide both surfaces because he could not give service to individual prescriptions. The patient would have to wait a long time, and the lenses would be most expensive as they would have to be made one by one.

When the prescription grinder puts on the second surface practically one day service can be given the patient. This is the practice in the art today and has been so for years.

The prescription grinder could not mold lens surfaces because he would have to have a mold for every prescription. This would run into thousands of molds, and besides he already has a large investment in second side grinding tools. He also is not skilled in the art of molding.

Recently plastic material of a hardness that will permit the grinding of good optical surfaces has been produced. Unfortunately the refractive index of this material varies greatly from that of optical crown glass on which the prescription grinder's tools is based, as well as those of the lens manufacturers.

The refractive index of a lens is an important factor in lens construction. To produce the same power in two lenses of different indices of refraction, different curvatures of surfaces must be used. If the refractive index is altered the tools based on the original index cannot be used. The lenses would be off power. It is then a principal object of my invention to provide the use of a plastic of sufficient hardness to be ground to good optical surfaces but of a different index of refraction from that on which present grinding tools are based to produce a lens of the required prescription value with the second side ground thereon by the prescription dispenser with the tools designed for use with a refractive index of optical crown glass now in the hands of the said prescription dispenser. This is a highly important provision as it will preserve the investments of many thousands of dollars.

Referring to the drawing wherein like reference characters refer to like parts throughout:

I first prepare a mold 1, Figs. V and VI, having a molding face 2 that is hard and smooth and will produce a good optical surface on the molded lens blank 3. This mold may be of glass having a ground and polished molding face 2, or it may be of a hard metal having a smooth molding surface. If the lens to have its first face molded is to have a continuous surface 4, the curves producing face 4 will be placed on the mold. This surface 4 may be spherical, cylindrical, toric or aspherical or any desired configuration.

If it is desired to produce a lens having recesses or projecting portions, provision is made on the face 2 of the mold to provide for it, as for example in Figs. III and IV are shown a bifocal lens having a distance field 5 and a reading segment or field 6. The optical center of the distance field, as at 7, that of the reading field at 8. The top line of the reading field 9 lies between the points 7 and 8 and has the shoulder 10. The under side 11 of the reading field is circular and merged with the distance field 5. This field 6 is recessed into the face 2 as shown in dotted lines 6 in Fig. VI.

It is clear that any desired configuration can be given the mold face 2.

A piece 3 of the plastic material is laid over the mold face 2 and molded to the configuration of the mold under heat and pressure.

As the material 3 has a hardness that will permit the grinding of good optical surfaces the front surface of the lens could also be ground instead of molded if desired.

If the index of refraction of the lens material 3 was the same as that to which the grinding tools for either the front or rear faces were calculated and made, the front face surface would be calculated to that of the said index of refraction, but where the material has a different index of refraction it is clear that the surface of the front face must be some different surface if the other index tools are to be used on the rear face, or else the required optical prescription value of the finished lens will not be obtained. To enable the use of the tools already in use I calculate the front surface of the blank to a surface that combined with the rear surface made with the old tools will produce the required prescription value of the lens. I make the mold surfaces 2 and 6 to these configurations. It is clear that if the manufacturer wishes to grind this first face instead of molding it, he will have to make a new selection of tools, because his old ones are made to a different index of refraction. However, if the manufacturer makes the front face to the modified surface the prescription grinder can produce the second side with the tools he now has without modification.

In Fig. VII, I have shown a grinding tool 14 of the character used by the prescription dispenser, the grinding face 12 may be concave or it may be convex as shown at 13, depending on the type of surface he is to grind.

The second or prescription face of the lens is indicated by 15 in Figs. II and IV.

As there are many characteristics besides index of refraction and hardness required in lenses, such as expansion, dispersion, chemical change, absorption, etc., it is not always possible to obtain the required characteristics with the desired index of refraction, and hence such lenses could not be dispensed by the prescription dispensers unless the manufacturer provided for the change in index of refraction in the front surfaces made by him. If my method were not adopted, there would have to be supplied complete new tool equipment to the prescription dispenser for each variation in the index of refraction.

Another decided and important advantage of the invention is that when molded front surfaces are used by the manufacturer types of surfaces not practically or economically obtainable by grinding may be employed cutting down materially the cost of production of such lenses, and materially widening the field and scope of commercially obtainable lenses which have hitherto not been adopted because of the difficulties and expense of production. This plastic lens material lends itself to these molding operations whereas glass lens material does not.

From the foregoing it will be seen that I have provided, simple, efficient and economical means for obtaining all the objects and advantages of the invention.

Having described my invention I claim:

1. A lens blank of plastic, transparent, synthetic resinous lens composition having an index of refraction different from that of optical crown glass and a hardness which approaches that of optical crown glass to the extent that like crown glass it may be ground and polished and having on one face an optical surface of a curvature modified by the amount which said material differs in index from optical crown glass so that when combined with an optical surface, on the other side of said blank, formed by abrading tools according to an index of refraction of substantially that of optical crown glass the power resulting from said optical surfaces and the index of refraction of said resinous lens composition will be substantially of the accurate prescription value simulating that resulting from the use of optical crown glass and surfaces formed by abrading tools according to an index of refraction of substantially that of crown glass.

2. A lens of plastic, transparent, synthetic resinous lens composition having an index of refraction different from that of optical crown glass by a given amount and a hardness which approaches that of optical crown glass to the extent that like crown glass it may be ground and polished and having on one face an optical surface abraded with abrading tools according to an index of refraction of substantially that of optical crown glass, and on the opposite face an optical surface modified from a curvature according to the index of refraction of optical crown glass by the amount of the difference of said given different index of refraction of the resinous composition from said crown glass so that when combined with the first surface it will produce substantially the required prescription value of the lens.

3. A lens blank of plastic, transparent, synthetic resinous lens composition having an index of refraction different from that of optical crown glass by a given amount and a hardness which approaches that of optical crown glass to the extent that like crown glass it may be ground and polished and having on one face a molded optical surface modified from a curvature according to the index of refraction of optical crown glass by the amount of the difference of said given different index of refraction of the resinous composition from said crown glass so that when combined with an optical surface on the other side abraded with abrading tools according to an index of refraction of substantially that of optical crown glass will produce substantially the required prescription value of the lens.

4. A lens of plastic, transparent, synthetic resinous lens composition having an index of refraction different from that of optical crown glass by a given amount and a hardness which approaches that of optical crown glass to the extent that like crown glass it may be ground and polished and having on one face an optical surface abraded with abrading tools according to an index of refraction of substantially that of optical crown glass, and on the opposite face a molded optical surface modified from a curvature according to the index of refraction of optical crown glass by the amount of the difference of said given different index of refraction of the resinous composition from said crown glass so that when combined with the first surface it will produce substantially the required prescription value of the lens.

5. A lens of plastic, transparent, synthetic resinous lens composition having an index of refraction different from that of optical crown glass by a given amount and a hardness which approaches that of optical crown glass to the extent that like crown glass it may be ground and polished and having finished optical surfaces on the opposed sides thereof, one of said surfaces being of a curvature formed with an abrading tool according to an index of refraction of substantially that of optical crown glass and the opposed surface being of a curvature modified according to the given difference of index of refraction of the resinous composition from that of optical crown glass and different from the first optical surface by an amount which, when combined with said first optical surface, will produce substantially the required prescriptive value of the lens.

6. A lens blank of plastic, transparent, synthetic resinous lens composition having an index of refraction different from that of optical crown glass by a given amount and a hardness which approaches that of optical crown glass to the extent that like crown glass it may be ground and polished having on one face an optical surface of a curvature modified according to the given difference of index of refraction of said resinous composition from optical crown glass and being such that a second surface on the opposed side of said blank may be formed with abrading tools formed according to an index of refraction of substantially that of optical crown glass and which, when combined with the first surface, will produce substantially the required prescriptive value of the finished lens.

7. A process of forming a lens of plastic transparent, synthetic, resinous material having an index of refraction different from that of optical crown glass by a given amount comprising forming on one side of said material a surface of a curvature different from that produced by conventional crown glass tools and controlled in part by the index of refraction of said resinous material and the difference of said index from that of ordinary optical crown glass, and forming on the opposed side, with one of a set of conventional abrading tools formed according to an index of refraction of optical crown glass, a surface to provide a combination of curvatures with material of said index of refraction which will produce substantially a power which is standard for lenses having the index of refraction of ophthalmic crown glass.

8. A lens of plastic, transparent, synthetic resinous lens composition having an index of refraction different from that of a lens medium for which standard abrading tools have been provided for surfacing one face thereof by a given amount and a hardness which approaches that of the lens medium for which the abrading tools have been designed to the extent that like said lens medium it may be ground and polished, said plastic, transparent, synthetic resinous lens composition having finished optical surfaces on the opposed sides thereof, one of said surfaces being of a curvature formed with an abrading tool according to an index of refraction substantially that of the lens medium and the opposed surface being of a curvature modified according to the difference of index of refraction of the resinous composition from that of said lens medium and different from the first optical surface by an amount which, when combined with said first optical surface, will produce substantially the required prescriptive value of the lens.

HAROLD R. MOULTON.